US009109546B2

(12) United States Patent  
Andreae et al.

(10) Patent No.: US 9,109,546 B2  
(45) Date of Patent: Aug. 18, 2015

(54) SYSTEM AND METHOD FOR OPERATING A HIGH PRESSURE COMPRESSOR BYPASS VALVE IN A TWO STAGE TURBOCHARGER SYSTEM

(75) Inventors: Morgan Andreae, Columbus, IN (US); Marcus Hoevener, Brownstown, IN (US); Adrian Dale, Columbus, IN (US); Vivek Sujan, Columbus, IN (US); Jeffrey Matthews, Columbus, IN (US)

(73) Assignee: Cummins Inc., Columbus, IN (US)

(\*) Notice: Subject to any disclaimer, the term of this patent is extended or adjusted under 35 U.S.C. 154(b) by 738 days.

(21) Appl. No.: 12/357,359

(22) Filed: Jan. 21, 2009

(65) Prior Publication Data

US 2010/0180590 A1 Jul. 22, 2010

(51) Int. Cl.
| | |
|---|---|
| F02D 23/00 | (2006.01) |
| F02M 25/07 | (2006.01) |
| F02B 37/013 | (2006.01) |
| F02B 37/16 | (2006.01) |
| F02B 37/18 | (2006.01) |
| F02B 39/00 | (2006.01) |
| F02B 37/00 | (2006.01) |

(52) U.S. Cl.
CPC .......... *F02M 25/0728* (2013.01); *F02B 37/004* (2013.01); *F02B 37/013* (2013.01); *F02B 37/16* (2013.01); *F02B 37/18* (2013.01); *F02B 39/00* (2013.01); *F02M 25/0711* (2013.01); *F02M 25/0718* (2013.01); *Y02T 10/121* (2013.01); *Y02T 10/144* (2013.01)

(58) Field of Classification Search
CPC ................................ F02D 23/00; F02B 33/44
USPC ................................ 60/611, 612, 605.1, 602
See application file for complete search history.

(56) References Cited

U.S. PATENT DOCUMENTS

| | | | |
|---|---|---|---|
| 3,576,102 A | | 4/1971 | West |
| 4,005,578 A | * | 2/1977 | McInerney ...................... 60/602 |
| 4,930,315 A | * | 6/1990 | Kanesaka ....................... 60/600 |
| 5,063,744 A | * | 11/1991 | Ishiyama et al. ................ 60/600 |
| 5,142,866 A | * | 9/1992 | Yanagihara et al. ......... 60/605.2 |
| 6,422,014 B1 | | 7/2002 | Gladden |
| 6,801,846 B1 | | 10/2004 | Rodriguez et al. |
| 7,000,393 B1 | | 2/2006 | Wood et al. |
| 2005/0056012 A1 | * | 3/2005 | Wild et al. ....................... 60/602 |
| 2006/0059910 A1 | * | 3/2006 | Spaeder et al. ................. 60/612 |
| 2009/0178406 A1 | * | 7/2009 | Matthews et al. ............... 60/602 |
| 2009/0211246 A1 | * | 8/2009 | McEwan et al. ................ 60/602 |

FOREIGN PATENT DOCUMENTS

WO  WO 2008015397 A1 *  2/2008

\* cited by examiner

*Primary Examiner* — Michael Andrews  
(74) *Attorney, Agent, or Firm* — Taft Stettinius & Hollister LLP (57) ABSTRACT

A system and method for controlling air flow in an engine system. In one embodiment, the system includes an engine, a turbocharger coupled to the engine, and a compressor bypass valve coupled to the turbocharger and to the engine. The compressor bypass valve includes a mechanism that allows the compressor bypass valve to be closed by default and allows the compressor bypass valve to be actuated passively when acted upon by a boost pressure when the boost pressure increases above a predefined pressure threshold. According to the system and method disclosed herein, the compressor bypass valve is passive, and thus controls air flow to the engine without requiring active control circuitry or logic.

17 Claims, 7 Drawing Sheets

SYSTEM AND METHOD FOR OPERATING A HIGH PRESSURE COMPRESSOR BYPASS VALVE IN A TWO STAGE TURBOCHARGER SYSTEM

FIELD OF THE INVENTION

The present invention relates to engine systems, and more particularly to utilization of a bypass valve in an engine system.

BACKGROUND OF THE INVENTION

Engine systems are used in a variety of applications such a vehicle applications. Some engine systems include a two-stage turbocharger system, which includes a low pressure turbocharger and a high pressure turbocharger. A turbocharger is a turbine-driven, forced-induction compressor that improves the efficiency of an engine by delivering greater air flow into the engine cylinders. Turbochargers are powered by the exhaust gases of the engine. A turbocharger typically includes a turbine and a compressor connected by an axle. Exhaust gases from the engine cause the turbine wheel to rotate, which drives the compressor. The compressor compresses ambient air and delivers the air to the intake manifold of the engine at higher pressure which results in greater air flow to the engine cylinders. The additional air makes it possible to add more fuel, which increases the power and torque output of the engine.

A problem with conventional two-stage turbocharger systems is that at certain high mass flow conditions, the high pressure compressor can act like a constriction. When the speed limit is reached on the high-pressure (HP) turbine, the flow through the HP turbine is bypassed. This reduces the efficiency of the HP turbine, which in turn reduces the ability of the HP compressor to efficiently compress the charge.

Accordingly, what is needed is an improved turbocharger system that does not restrict air flow to the engine. The turbocharger system should be cost-effective. The present invention addresses such a need.

SUMMARY OF THE INVENTION

A system and method for controlling air flow in an engine system is disclosed. In one embodiment, the system includes an engine, a turbocharger coupled to the engine, and a compressor bypass valve coupled to the high pressure turbocharger and to the engine. The compressor bypass valve includes a mechanism that allows the compressor bypass valve to be closed by default and allows the compressor bypass valve to be actuated passively when acted upon by a boost pressure when the boost pressure increases above a predefined pressure threshold. According to the system and method disclosed herein, the compressor bypass valve is passive, and thus controls air flow to the engine without requiring active control circuitry or logic.

DETAILED DESCRIPTION OF THE INVENTION

The present invention relates to engine systems, and more particularly to utilization of a bypass valve in an engine system. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention for controlling air flow in an engine system are disclosed. The engine system includes an engine, a low pressure turbocharger and a high pressure turbocharger. A compressor bypass valve coupled to the high pressure turbocharger enables air to bypass the high pressure turbocharger and to flow directly to the engine. The compressor bypass valve is configured to be closed by default and to be actuated passively by boost pressure from the low power turbine, to which the compressor bypass valve is fluidically coupled, as the boost pressure increases above a predefined pressure threshold. In one embodiment, the boost pressure is the pressure acting on the compressor bypass valve coming from the direction of an air inlet. Bypassing the high pressure turbocharger is beneficial, because it eliminates any possible restriction that the high pressure turbocharger can impose on the air flow to the engine. As a result, the engine receives sufficient air flow when needed at the higher engine speeds and loads. Because the compressor bypass valve is actuated passively, no additional actuation mechanisms or circuitry is needed. To more particularly describe the features of the present invention, refer now to the following description in conjunction with the accompanying figures.

Figure 1:
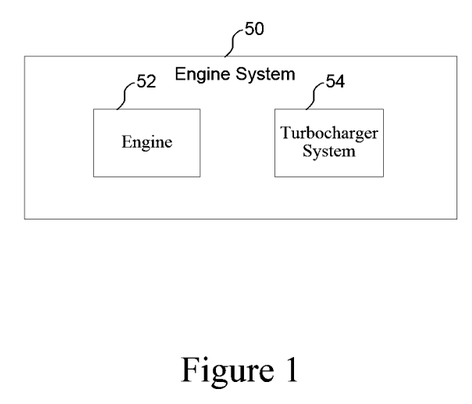
FIG. 1 is a block diagram of an engine system in accordance with one embodiment.

FIG. 1 is a block diagram of an engine system in accordance with one embodiment. Embodiments of the present invention may have both vehicle and non-vehicle applications, and still remain within the spirit and scope of the present invention. For example, the engine system 50 may be part of a vehicle, a generator, or other applications, etc.

Figure 2:
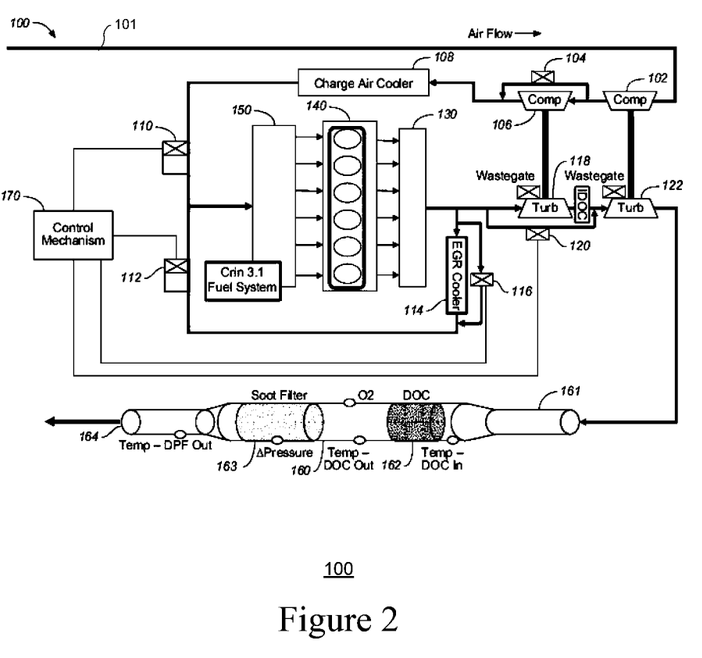
FIG. 2 is a block diagram of a turbocharger system in accordance with one embodiment.

As FIG. 1 shows, the engine system 50 includes an engine 52 and a turbocharger system 54. FIG. 2 shows a block diagram of a turbocharger system 100 in accordance with one embodiment. In one embodiment, the turbocharger system 100 may be used to implement the turbocharger system 54 of FIG. 1. The turbocharger system 100 includes an air inlet 101, low pressure (LP) compressor 102, high pressure (HP) compressor 106, a compressor bypass valve 104, a charge air cooler 108, an intake throttle 110, an exhaust gas recirculation (EGR) valve 112 coupled to the intake throttle 110, an EGR cooler 114, an EGR cooler bypass valve 116, a HP turbine 118, a LP turbine 122 and a turbine bypass valve 120. Also shown is an exhaust manifold 130, a crankcase 140, an intake manifold 150, an exhaust configuration 160 that includes an exhaust intake 161, a diesel oxidation catalyst (DOC) 162, a catalyzed soot filter 163, and an exhaust outlet 164. Finally, a control mechanism 170 for controlling the selective actuation of the valves is shown. In one embodiment, the turbocharger system 100 is an engine or the like, and the control mechanism 170 may include hardware and/or software control components.

In particular embodiments, the key hardware features used in the thermal management strategy are the intake throttle 110, the compressor bypass valve 104, the EGR valve 112, the EGR cooler bypass valve 116 and the turbine bypass valve 120. These features impact engine operation in two broad ways. First, they control the composition and quantity of gases entering the cylinders. Higher ratios of fuel mass to fresh air plus EGR mass lead to higher combustion temperatures and therefore higher exhaust temperatures. Second, these features can impact engine efficiency. Less efficient engine operation results in more fuel consumption for a given brake power, and therefore higher exhaust gas temperatures for that brake power.

In particular embodiments, the fuel system may also be useful in the thermal management system. By adjusting the fuel injection strategy, not only can the exhaust temperature be increased, but unburned hydro-carbons can also be generated. These unburned hydro-carbons (if temperatures are high enough) will oxidize at the DOC, further raising the exhaust gas temperatures.

Additionally, in FIG. 2, an interstage diesel oxidation catalyst (iDOC) is shown between the HP and LP turbines 118 and 122. The purpose of this DOC is to oxidize hydro-carbons during normal operation to minimize hydro-carbons emissions (exhaust temperatures at low loads can be low enough with high EGR rates, that the downstream DOC is not particularly effective). During thermal management, significant hydro-carbons are generated to raise the temperature of the exhaust at the downstream DOC. The HP turbine is mostly bypassed during thermal management, but some flow may be required to maintain minimum HP turbine speed (maintain thrust margin in HP turbo). The unburned hydro-carbons in this small amount of flow through the HP turbine will oxidize in the iDOC during thermal management.

Flow of fresh air into the engine can be limited in a number of ways. The intake throttle 110 can be closed. The compressor bypass valve 104 can be opened to reduce the boost and therefore fresh air flow. The turbine bypass valve 120 can be actuated to allow flow to bypass the HP turbine 118, also reducing boost. The HP turbine 118 can be bypassed partially or completely. Furthermore, an exhaust braking feature of the turbine bypass valve 120 can be enabled, resulting in higher back pressure and lower flow through the engine.

In one embodiment, exhaust braking may involve closing off the exhaust path from the engine, causing the exhaust gases to be compressed in the exhaust manifold and in the cylinder. Because the exhaust is being compressed, and there is no fuel being applied and the engine works backwards, whereby the amount of negative torque generated is usually directly proportional to the back pressure of the engine.

Additionally, the EGR valve 112 can also be used to reduce fresh air flow. Opening the EGR valve 112 displaces fresh air with EGR. By using both the EGR valve 112 and the intake throttle 110, both the charge flow and EGR fraction can be controlled. Although lowering the fresh air flow generally helps increase combustion temperatures, higher EGR fractions lower the temperature of combustion. However, the use of some EGR may be necessary during thermal management to reduce emissions of NOx. The impact on exhaust temperature can be minimized by using hot EGR instead of cooled EGR. The EGR cooler bypass valve 116 allows for the flow of EGR to bypass the EGR cooler 114. Bypassing the cooler 114 avoids any problems with fouling the cooler 114 with unburned hydrocarbons if in-cylinder dosing is used for thermal management. Consequently, the selective actuation of EGR valve 112, EGR cooler bypass valve 116, and intake throttle 110 can achieve a wide range of charge compositions and flows.

All of these features can also be used to reduce the efficiency of the engine. Closing the throttle 110 increases pumping work. Boost can be reduced by either opening the compressor bypass 104 or by actuating the turbine bypass valve 120 to bypass the HP turbine 118. Lower boost will lead to less charge mass, lower peak cylinder pressures and temperatures, and less efficient combustion. Furthermore, actuating the three way valve to act as an exhaust brake reduces efficiency by increasing the pumping work of the engine.

Figure 3:
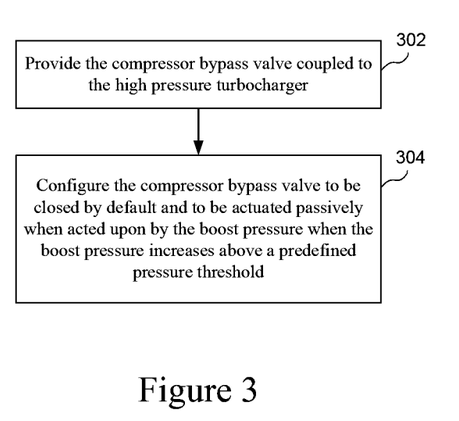
FIG. 3 is a flow chart showing a method for controlling air flow in an engine system in accordance with one embodiment.

FIG. 3 is a flow chart showing a method for controlling air flow in an engine system in accordance with one embodiment. Referring to both FIGS. 2 and 3 together, the process begins in step 302 where the compressor bypass valve 104 coupled to the high pressure compressor 106 is provided. Next, in step 304, the compressor bypass valve 104 is configured to be closed by default and to be actuated passively when acted upon by the boost pressure when the boost pressure increases above a predefined pressure threshold. In one embodiment, the boost pressure is the pressure acting on the upstream or air-inlet side of the compressor bypass valve 104 coming from the direction of the air inlet 101. The compressor bypass valve 104 is passive in that it is not actuated by active control circuitry or control logic but is instead actuated passively by pressure. As described in more detail below, the compressor bypass valve 104 can be configured or adjusted to open at a predefined pressure threshold. The specific pressure threshold will depend on the specific application. By opening or closing, the compressor bypass valve 104 regulates the intake manifold pressure by engaging or bypassing the HP compressor 106 in the air stream.

In particular embodiments, the pressure threshold sufficient to actuate, push open, the compressor bypass valve 104 is a predefined pressure threshold. The specific pressure threshold will depend on the specification application. In one embodiment, actuation of the compressor bypass valve 104 is based on the boost pressure. For example, the compressor bypass valve 104 opens, when the boost pressure reaches the predefined pressure threshold and as the boost pressure begins to push the compressor bypass valve 104 open.

In one embodiment, as the mass flow through the engine increases, the speed of the HP turbine 118 increases. Once the speed limit of the HP turbine 118 is reached (e.g., ~165,000 rpm), the turbine bypass valve 120 is opened to ensure that the HP turbine 118 speed limit is not exceeded. The turbine bypass valve is controlled by an electronic actuator. The actuator is controlled by signals from the ECM, and control is based on exhaust pressure in locations in the exhaust system, engine speed, torque, desired operating mode (normal operation, thermal management, altitude, etc.), and other parameters. By varying the control of the turbine bypass valve 120, the flow through the HP turbocharger 118 can be modulated. This maximizes the boost generated by the HP turbocharger 118 without exceeding the HP speed limit. At higher engine powers and more importantly higher mass flows, the turbine bypass valve 120 is opened completely. In particular embodiments, some flow may still passes through the HP turbine 118.

At the HP compressor 106, at lower mass flows, all flow goes through the HP compressor 106. Once the turbine bypass valve 120 is opened, the compressor bypass valve 104 initially remains closed. While a significant portion of the flow still flows through the HP turbine 118, the HP compressor 106 may still generate some boost. At very high mass flows, when the turbine bypass valve 120 is completely open, the HP turbine 118 generates very little boost. If the compressor bypass valve 104 is not opened, the HP compressor 106 can act like a restriction. This is because a small portion of the exhaust flow is going through the HP turbine 118, but all of the flow is going through the HP compressor 106. At this point, the compressor bypass valve 104 is opened, eliminating the flow restriction and allowing more boost to be generated at the LP compressor 102.

Figure 4:
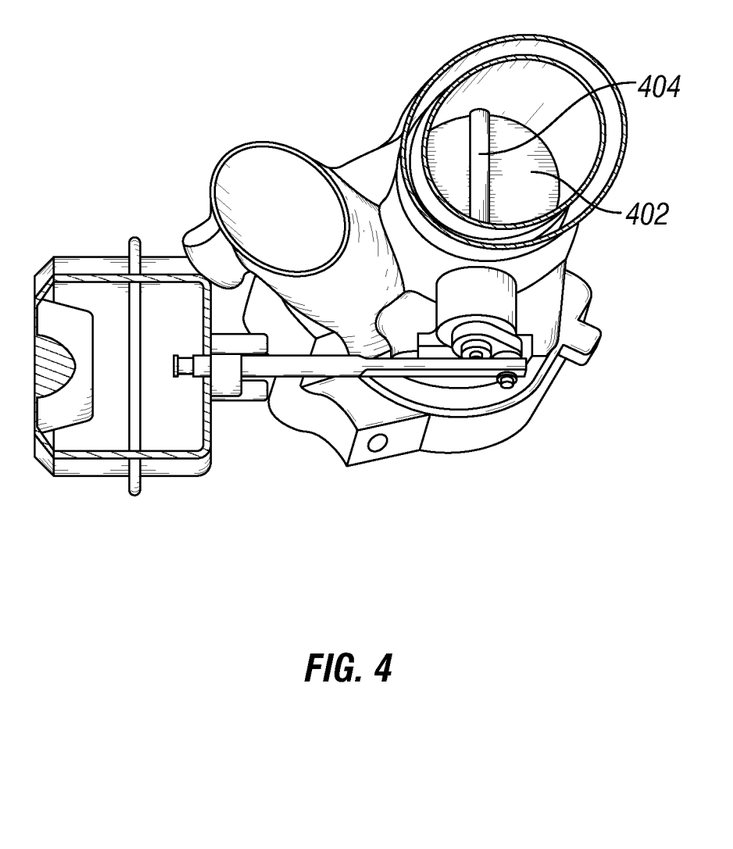
FIG. 4 is a diagram of a butterfly valve, which may be used to implement the compressor bypass valve of FIG. 2, in accordance with one embodiment.

FIG. 4 is a diagram of a butterfly valve 400, which may be used to implement the compressor bypass valve 104 of FIG. 2, in accordance with one embodiment. In one embodiment, the butterfly valve 400 includes a flat circular plate 402 and a rod 404 through the plate 402. The plate 402 rotates around the rod 404 to open or close in order to regulate air flow. In one embodiment, the rod 404 may be positioned across the center of the plate 402. In an alternative embodiment, the rod may be offset off of the center of the plate 402.

Figure 5:
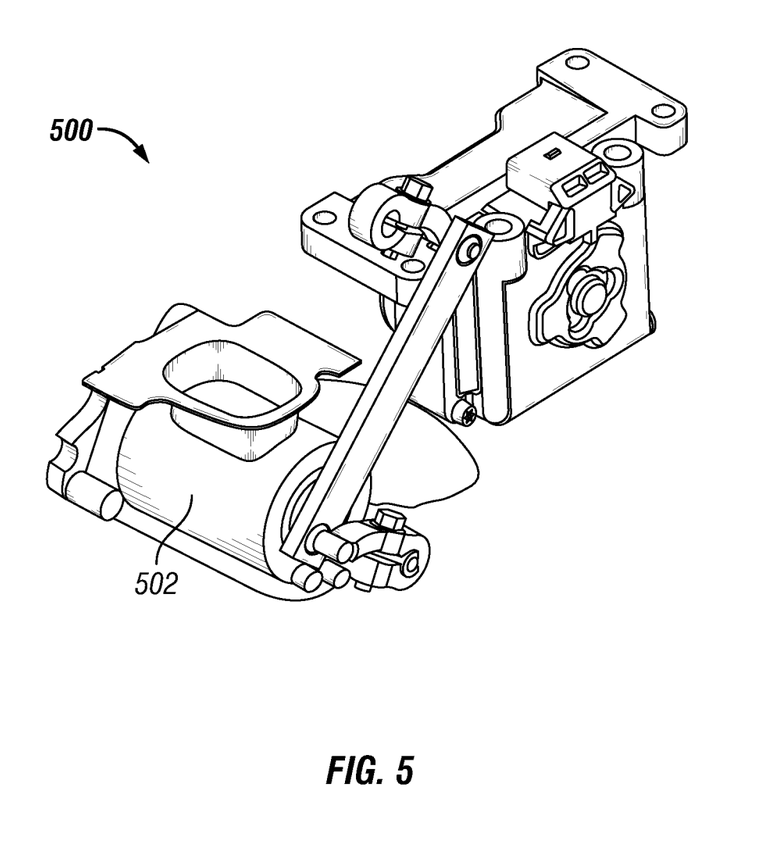
FIG. 5 is a diagram of a rotary valve, which may be used to implement the compressor bypass valve of FIG. 2, in accordance with one embodiment.

FIG. 5 is a diagram of a rotary valve 500, which may be used to implement the compressor bypass valve 104 of FIG. 2, in accordance with one embodiment. In one embodiment, the rotary valve 500 includes a body 502 that rotates to regulate air flow.

Figure 6:
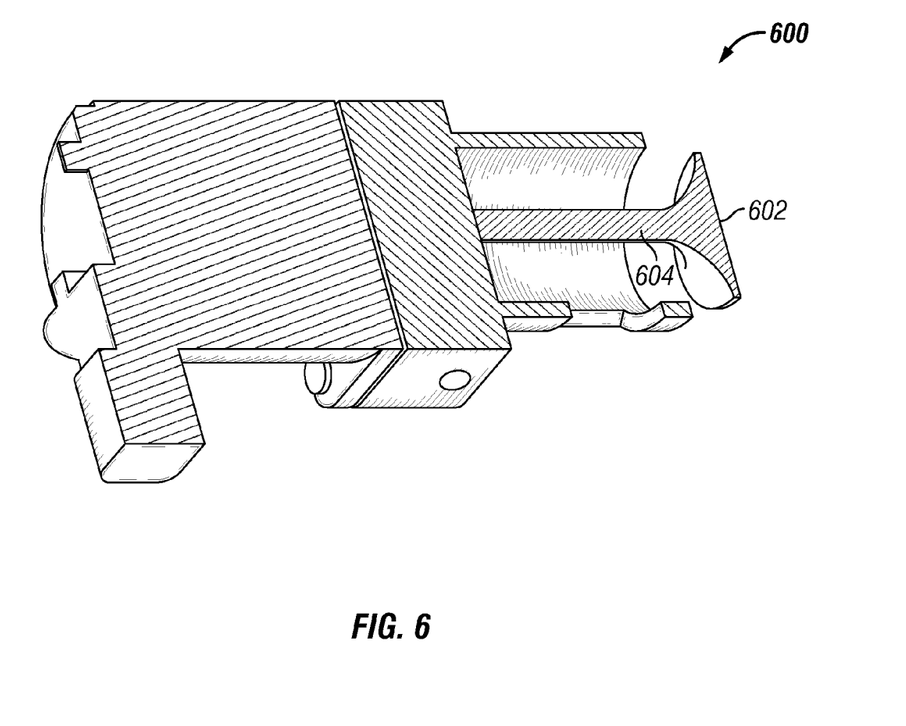
FIG. 6 is a diagram of a single poppet valve, which may be used to implement the compressor bypass valve of FIG. 2, in accordance with one embodiment.

FIG. 6 is a diagram of a single poppet valve 600, which may be used to implement the compressor bypass valve 104 of FIG. 2, in accordance with one embodiment. In one embodiment, the poppet valve 600 includes a disk-shape plug 602 on the end of a valve stem 604, where the valve stem 604 guides the plug 602 to regulate air flow.

Figure 7:
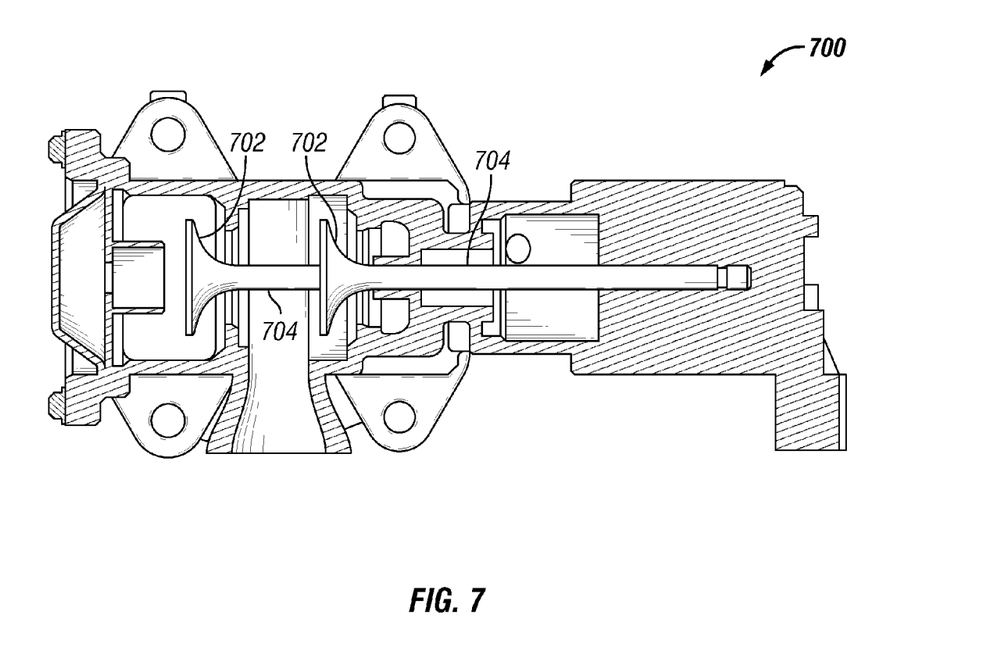
FIG. 7 is a diagram of a dual poppet valve, which may be used to implement the compressor bypass valve of FIG. 2, in accordance with one embodiment.

FIG. 7 is a diagram of a dual poppet valve 700, which may be used to implement the compressor bypass valve 104 of FIG. 2, in accordance with one embodiment. In one embodiment, the poppet valve 700 includes two disk-shaped plugs 702 on the end of respective valve stems 704, where the valve stems 704 guide the plugs 702 to regulate air flow.

Although the present invention disclosed herein is described in the context of a butterfly valve, rotary valve, single poppet valve, and dual poppet valve, the present invention may apply to other valve types, and still remain within the spirit and scope of the present invention. For example, the compression bypass valve may also be a ball valve, any type of waste gate, etc.

In another example, in one embodiment, the compressor bypass valve may be spring loaded by a lever arm and a spring to force the compressor bypass valve closed. As the boost pressure on the compressor bypass valve increases. When the boost pressure reaches a predefined pressure threshold, the boost pressure overcomes the spring force, causing the lever to open the compressor bypass valve. In one embodiment, the required amount of boost pressure to push the compressor bypass valve open may be changed by changing the spring rate or tension of the compressor bypass valve.

According to the system and method disclosed herein, the present invention provides numerous benefits. For example, embodiments of the present invention are simple and require no active control circuitry or control logic, which saves space and reduces costs. The bypass valve itself also prevents air flow losses due to restrictions otherwise induced by the compressor. This has the net effect of making the engine more efficient.

A system and method in accordance with the present invention for controlling air flow in an engine system has been disclosed. The engine system includes an engine, a low pressure turbocharger and a high pressure turbocharger. A compressor bypass valve coupled to the high pressure turbocharger enables air to bypass the high pressure turbocharger and to flow directly to the engine. The compressor bypass valve is configured to be closed by default and to be actuated passively when acted upon by the boost when the boost pressure increases above a predefined pressure threshold.

The present invention has been described in accordance with the embodiments shown. One of ordinary skill in the art will readily recognize that there could be variations to the embodiments, and that any variations would be within the spirit and scope of the present invention. Accordingly, many modifications may be made by one of ordinary skill in the art without departing from the spirit and scope of the appended claims.

What is claimed is:

1. An engine system comprising:
   an engine;
   a first turbocharger and a second turbocharger coupled to the engine, the first turbocharger being a high pressure turbocharger with a first turbine and the second turbocharger being a low pressure turbocharger with a second turbine, and further comprising a turbine bypass valve coupled to a turbine bypass around the first turbine, wherein the turbine bypass valve is controlled to open in response to a turbine speed limit being reached; and
   a compressor bypass valve coupled to the first turbocharger and to the engine, the compressor bypass valve comprises a mechanism that allows the compressor bypass valve to be closed by default and allows the compressor bypass valve to be actuated passively when acted upon by a boost pressure when the boost pressure increases above a predefined pressure threshold, wherein the compressor boost valve actuation is accomplished solely with boost pressure and free of active control circuitry or control logic in response to a mass flow through the engine causing the turbine bypass valve to completely open.

2. The system of claim 1 wherein the boost pressure after reaching the predefined pressure threshold pushes the compressor bypass valve open.

3. The system of claim 1 wherein the compressor bypass valve is a butterfly valve.

4. The system of claim 1 wherein the compressor bypass valve is a rotary valve.

5. The system of claim 1 wherein the compressor bypass valve is a single poppet valve.

6. The system of claim 1 wherein the compressor bypass valve is a dual poppet valve.

7. A vehicle comprising:
   an engine;
   a first turbocharger and a second turbocharger coupled to the engine, the first turbocharger being a high pressure turbocharger with a first turbine and the second turbocharger being a low pressure turbocharger with a second turbine, and further comprising a turbine bypass valve coupled to a turbine bypass around the first turbine, wherein the turbine bypass valve is controlled to open in response to a turbine speed limit being reached; and
   a compressor bypass valve coupled to the first turbocharger and to the engine, the compressor bypass valve being normally closed by default and operable free of any active control logic or control circuitry to be actuated passively when acted upon by a boost pressure when the boost pressure increases above a predefined pressure threshold in response to a mass flow through the engine causing the turbine bypass valve to completely open.

8. The vehicle of claim 7 wherein the boost pressure after reaching the predefined pressure threshold pushes the compressor bypass valve open.

9. The vehicle of claim 7 wherein the compressor bypass valve is a butterfly valve.

10. The vehicle of claim 7 wherein the compressor bypass valve is a rotary valve.

11. The vehicle of claim 7 wherein the compressor bypass valve is a single poppet valve.

12. The vehicle of claim 7 wherein the compressor bypass valve is a dual poppet valve.

13. A method comprising:
providing a compressor bypass valve coupled to a first turbocharger and to an engine, wherein the first turbocharger and a second turbocharger are coupled to the engine, the first turbocharger being a high pressure turbocharger with a first turbine and the second turbocharger being a low pressure turbocharger with a second turbine, and further comprising a turbine bypass valve coupled to a turbine bypass around the first turbine;
controlling the turbine bypass valve to open in response to a speed limit of the turbine being reached; and
configuring the compressor bypass valve to be closed by default and to be actuated free of any active control logic or control circuitry when acted upon by a boost pressure when the boost pressure increases above a predefined pressure threshold in response to a mass flow through the engine causing the turbine bypass valve to completely open.

14. The method of claim 13 wherein the boost pressure after reaching the predefined pressure threshold pushes the compressor bypass valve open.

15. The method of claim 13 Wherein the compressor bypass valve is a butterfly valve.

16. The method of claim 13 Wherein the compressor bypass valve is a rotary valve.

17. The method of claim 13 wherein the compressor bypass valve is a single poppet valve.

* * * * *